(12) United States Patent
Verma et al.

(10) Patent No.: US 8,165,061 B2
(45) Date of Patent: Apr. 24, 2012

(54) INTER WORKING FUNCTION (IWF) AS LOGICAL RADIO NETWORK CONTROLLER (RNC) FOR HYBRID COUPLING IN AN INTERWORKING BETWEEN WLAN AND A MOBILE COMMUNICATIONS NETWORK

(75) Inventors: Shaily Verma, Mumbai (IN); Charles Chuanming Wang, Jamison, PA (US)

(73) Assignee: Thomson Licensing, Boulogne-Billancourt (FR)

( * ) Notice: Subject to any disclaimer, the term of this patent is extended or adjusted under 35 U.S.C. 154(b) by 1556 days.

(21) Appl. No.: 10/517,131

(22) PCT Filed: May 30, 2003

(86) PCT No.: PCT/US03/17096
§ 371 (c)(1), (2), (4) Date: Dec. 6, 2004

(87) PCT Pub. No.: WO03/105007
PCT Pub. Date: Dec. 18, 2003

(65) Prior Publication Data
US 2005/0210154 A1 Sep. 22, 2005

Related U.S. Application Data

(60) Provisional application No. 60/386,638, filed on Jun. 6, 2002.

(51) Int. Cl.
*H04B 7/212* (2006.01)

(52) U.S. Cl. ............... 370/324; 370/426.1; 370/331; 370/353; 370/352; 370/913; 370/390; 370/537; 370/468; 370/432; 370/501; 370/439; 370/442; 370/438; 370/437; 455/426.1; 455/437; 455/452.2; 455/422; 455/445

(58) Field of Classification Search .......... 370/458, 370/331, 353, 352, 913, 401, 338, 443, 335, 370/252, 442, 438, 437, 390, 537, 468, 432, 370/329, 404, 402, 342, 441; 455/426.1, 455/437, 439, 432.2, 501, 452.2, 67.11, 445, 455/422.1, 574, 450; 709/238
See application file for complete search history.

(56) References Cited

U.S. PATENT DOCUMENTS
5,260,987 A 11/1993 Mauger
(Continued)

FOREIGN PATENT DOCUMENTS
EP 1146691 A1 10/2001
(Continued)

OTHER PUBLICATIONS
Search Report Dated Sep. 21, 2003.
(Continued)

*Primary Examiner* — Rafael Pérez-Gutiérrez
*Assistant Examiner* — Joseph Arévalo
(74) *Attorney, Agent, or Firm* — Robert D. Shedd; Jeffrey M. Navon; Jerome G. Schaefer

(57) ABSTRACT

There is provided a method of supporting an interworking between a wireless local area network (WLAN) and a mobile communications network. The interworking is facilitated by an interworking function (IWF) disposed on a WLAN side of the interworking. The method comprises the step of connecting the WLAN to the mobile communications network by employing the IWF as an auxiliary radio network controller for the mobile communications network, in particular, a drift radio network controller (DRNC) in a UMTS network.

14 Claims, 3 Drawing Sheets

U.S. PATENT DOCUMENTS

| | | | |
|---|---|---|---|
| 5,956,331 | A | 9/1999 | Rautiola et al. |
| 6,243,581 | B1 * | 6/2001 | Jawanda ................... 455/432.2 |
| 6,374,112 | B1 * | 4/2002 | Widegren et al. .......... 455/452.2 |
| 6,463,055 | B1 * | 10/2002 | Lupien et al. ................ 370/353 |
| 6,674,765 | B1 * | 1/2004 | Chuah et al. ................. 370/458 |
| 6,757,293 | B1 * | 6/2004 | Chuah et al. ................. 370/432 |
| 6,975,634 | B1 * | 12/2005 | Chow et al. .................. 370/401 |
| 6,996,079 | B1 * | 2/2006 | Bergenwall et al. ......... 370/331 |
| 7,010,300 | B1 * | 3/2006 | Jones et al. ................... 455/439 |
| 7,227,849 | B1 * | 6/2007 | Rasanen ....................... 370/329 |
| 2001/0027490 | A1 * | 10/2001 | Fodor et al. .................. 709/238 |
| 2002/0068592 | A1 * | 6/2002 | Hutcheson et al. ........... 455/501 |
| 2002/0085540 | A1 | 7/2002 | Hyvarinen et al. |
| 2002/0147008 | A1 * | 10/2002 | Kallio ........................... 455/426 |
| 2002/0196749 | A1 * | 12/2002 | Eyuboglu et al. ............. 370/328 |
| 2003/0036374 | A1 | 2/2003 | English et al. |
| 2003/0095522 | A1 | 5/2003 | Korus et al. |
| 2003/0185240 | A1 * | 10/2003 | Vuong ........................... 370/474 |
| 2003/0214951 | A1 * | 11/2003 | Joshi et al. ............... 370/395.42 |
| 2003/0236982 | A1 * | 12/2003 | Hsu ................................ 713/171 |
| 2004/0071109 | A1 * | 4/2004 | Herle et al. ................... 370/328 |
| 2004/0082366 | A1 * | 4/2004 | Longoni et al. ............... 455/561 |
| 2004/0095924 | A1 * | 5/2004 | Holur et al. ................... 370/352 |
| 2004/0116140 | A1 * | 6/2004 | Babbar et al. ................. 455/517 |
| 2004/0219923 | A1 * | 11/2004 | Oses et al. ..................... 455/445 |
| 2005/0180450 | A1 * | 8/2005 | Gaal et al. ..................... 370/437 |
| 2005/0240760 | A1 * | 10/2005 | Zhang ............................ 713/157 |
| 2005/0250505 | A1 * | 11/2005 | Rasanen ........................ 455/450 |
| 2005/0286528 | A1 * | 12/2005 | Kekki ......................... 370/395.1 |

FOREIGN PATENT DOCUMENTS

| | | |
|---|---|---|
| WO | 9948312 A1 | 9/1999 |
| WO | WO9945736 | 9/1999 |
| WO | WO0189251 | 11/2001 |
| WO | 0199441 A2 | 12/2001 |
| WO | 0217599 A2 | 2/2002 |

OTHER PUBLICATIONS

Supplementary European Search Report dated Oct. 12, 2009 for Appln. No. EP 03 75 7301.

Sawahashi et al., W-CDMA Wireless Access—Network Configuration (Apparatus Configuration), The Journal of the Institute of Image Information and Television Engineers, vol. 55, No. 4, Apr. 20, 2011, pp. 537-538.

* cited by examiner

INTER WORKING FUNCTION (IWF) AS LOGICAL RADIO NETWORK CONTROLLER (RNC) FOR HYBRID COUPLING IN AN INTERWORKING BETWEEN WLAN AND A MOBILE COMMUNICATIONS NETWORK

This application claims the benefit, under 35 U.S.C. §365 of International Application PCT/US03/17096, filed May 30, 2003, which was published in accordance with PCT Article 21(2) on Dec. 18, 2003 in English and which claims the benefit of U.S. provisional patent application No. 60/386,638, filed Jun. 6, 2002.

BACKGROUND OF THE INVENTION

1. Field of the Invention

The present invention generally relates to networks and, more particularly, to the utilization of an InterWorking Function (IWF) as a logical Radio Network Controller (RNC) for a hybrid coupling between a Wireless Local Area Network (WLAN) and a mobile communications network.

2. Background of the Invention

A number of different architectures may be employed in an interworking between a Wireless Local Area Network (WLAN) coverage area and mobile communications network technologies such as Universal Mobile Telecommunications System (UMTS). As is known, WLANs offer much higher access data rates than cellular mobile networks such as UMTS, but provide very limited coverage (typically up to 100 meters from the radio transmitter), while UMTS offers widespread coverage (ranging several hundred kilometers). Interworking may be provided between a WLAN hotspot and a mobile communications network such as UMTS to allow a user to utilize either the WLAN or the mobile communications network, or both, depending on the location of the user. The interworking between the WLAN and the mobile communications network may provide the user with roaming capability as the user moves between, and through, the coverage areas of the WLAN and the mobile communications network in order to efficiently use the capabilities of the access networks. However, it is typically the case that the user and control planes are not separate in such an interworking and, thus, the Quality of Service (QOS) negotiations, mobility, Authentication Authorization and Accounting (AAA) procedures of the UMTS are not re-used, resulting in expensive UMTS radio resources being tied up implementing these functions.

Accordingly, it would be desirable and highly advantageous to have a WLAN-UMTS interworking such that aids in separating the user and control planes such that the signaling still goes through the UMTS network but the data uses the WLAN radio resources. Such an interworking would provide the advantage that the QOS negotiations, mobility, AAA procedures of the UMTS are re-used while freeing up expensive UMTS radio resources.

SUMMARY OF THE INVENTION

The problems stated above, as well as other related problems of the prior art, are solved by the present invention, which is directed to the utilization of an InterWorking Function (IWF) as a logical Radio Network Controller (RNC) for a hybrid coupling between a Wireless Local Area Network (WLAN) and a mobile communications network.

According to an illustrative embodiment of the present invention, there is provided a method for supporting an interworking between a Wireless Local Area Network (WLAN) and a mobile communications network. The interworking is facilitated by an InterWorking Function (IWF) disposed on a WLAN side of the mobile communications network. The method comprises the step of connecting the WLAN to the mobile communications network by employing the IWF as a Drift Radio Network Controller (DRNC) for the mobile communications network.

According to another aspect of the present invention, there is provided an apparatus for supporting an interworking between a Wireless Local Area Network (WLAN) and a mobile communications network. The interworking is facilitated by an InterWorking Function (IWF) disposed on a WLAN side of the mobile communications network. The apparatus comprises means for connecting the WLAN to the mobile communications network using the IWF as a Drift Radio Network Controller (DRNC) for the mobile communications network.

These and other aspects, features and advantages of the present invention will become apparent from the following detailed description of preferred embodiments, which is to be read in connection with the accompanying drawings.

DETAILED DESCRIPTION OF THE INVENTION

Figure 1:
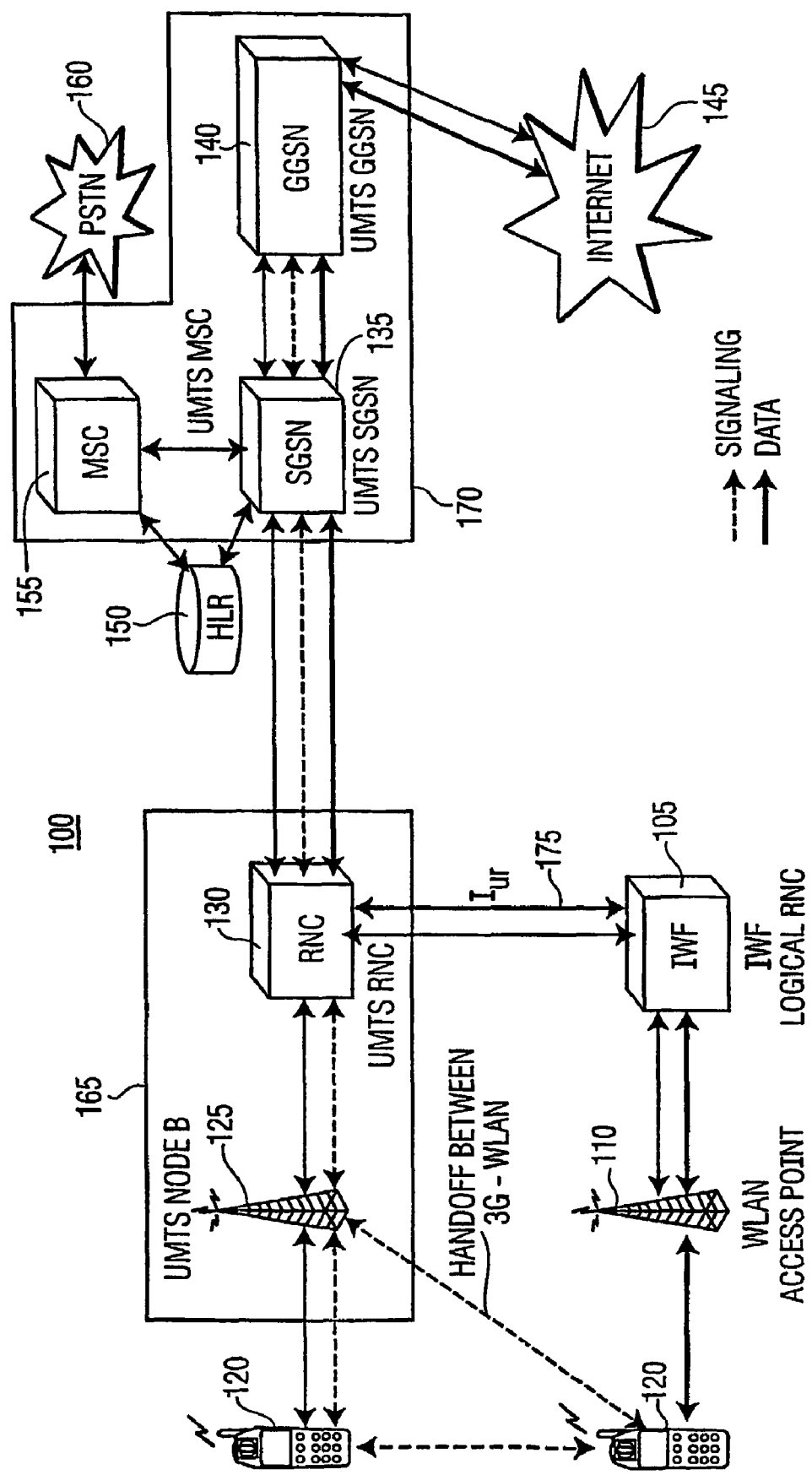
FIG. 1 is a block diagram illustrating a communication structure 100 to which the present invention may be applied, according to an illustrative embodiment of the present invention.

The present invention is directed to the utilization of an InterWorking Function (IWF) as a logical Radio Network Controller (RNC) for a hybrid coupling between a Wireless Local Area Network (WLAN) and a mobile communications network. In a preferred embodiment of the present invention, the coupling is between a WLAN and a third generation (3G) Universal Mobile Telecommunications System (UMTS). However, it is to be appreciated that the present invention is not limited to UMTS (with respect to the mobile communications network that is coupled to the WLAN) and, thus, any other type of a mobile communications network may also be employed in a coupling with the WLAN while maintaining the spirit and scope of the present invention. Some of the many types of other mobile communications networks include those employing, e.g., Code Division Multiple Access (CDMA) 2000, General Packet Radio Service (GPRS), and so forth.

With respect to the preferred embodiment of the present invention that involves a coupling between a WLAN and a UMTS, the present invention allows the high spectrum cost and low data rates of UMTS to be complemented by the unlicensed band, high data rate but small coverage area of WLANs. The present invention essentially uses the user plane interface to connect the WLAN to the UMTS network over the Iur interface and uses the UMTS network to carry the signaling or control plane.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

FIG. 1 is a block diagram illustrating a communication structure 100 to which the present invention may be applied, according to an illustrative embodiment of the present invention. A description will now be given with respect to FIG. 1 of a UMTS-WLAN interworking that employs an InterWorking Function (IWF) as a logical Drift Radio Network Controller (DRNC) for the UMTS, according to an illustrative embodiment of the present invention. The WLAN may be, but is not limited to, a WLAN according to the Institute of Electrical and Electronics Engineers (IEEE) specification 802.11 or to the European Telecommunications Standards Institute (ETSI) High Performance Radio Local Area Network Type 2 (HIPERLAN2).

The communication structure includes an InterWorking Function (IWF) as a logical Radio Network Controller (RNC) (and hence reference numeral 105 shall be interchangeably used herein to represent the IWF and the logical RNC, as they are one and the same for the purposes of the present invention), a WLAN Access Point (AP) 110, a User Equipment (UE) 120, a UMTS Node B 125, a UMTS RNC 130, a Serving General Packet Radio Service (GPRS) Support Node (SGSN) 135, a Gateway General Packet Radio Service (GPRS) Support Node (GGSN) 140, the Internet 145, a Home Location Register (HLR) 150, a Mobile Switching Center (MSC) 155, and a Public Switched Telephone Network (PSTN) 160.

UMTS Node B 125 includes a transceiver for communicating with UE 120 via the air interface. UMTS Node B 125 performs various front end functions for providing communications between UE 120 and UMTS RNC 130. UMTS RNC 130 performs the management of the radio interface and interfaces with SGSN 135. SGSN 135 provides the interface between UTRAN 165 and the packet switched network, and performs a role similar to that of MSC 155 in the circuit switched portion. SGSN 135 performs mobility management and session management support. Communications structure 100 may comprise a plurality of UTRAN 165 coupled to SGNS 135. GGSN 140 interconnects the public land mobile network (PLMN) to any other packet data network (PDN), for example, the Internet. GGSN 140 may be viewed as an IP router that performs such functions as address mapping and tunneling. There is generally one GGSN 140 for the PLMN. MSC 155 routes calls in the circuit switched network and is connected to PTSN 160. HLR 150 is a database that administers the subscriber related data. It contains information such as, the services to which the subscriber is entitled, and the location of the area in which the subscriber is currently registered. The information of a subscriber can be retrieved using either the subscriber's unique international mobile subscriber identity number (IMSI) or Mobile Station International ISDN number (MSISDN).

The UE 120 communicates with a UMTS Terrestrial Radio Access Network (UTRAN) 165, the latter including the Node B 125 and the RNC 130. The UTRAN 165, in turn, is connected to a Core Network (CN) 170 that includes the SGSN 135 (packet based services), the MSC 155 (circuit based services) and the GGSN 140 (gateway to other Public Land Mobile Networks (PLMNs)). The UMTS network may include a plurality of UTRAN 165 coupled to CN 170. An Iu interface connects the UTRAN 165 to the CN 170. The UMTS network may include a plurality of UTRANs 165 coupled to CN 170.

Figure 2:
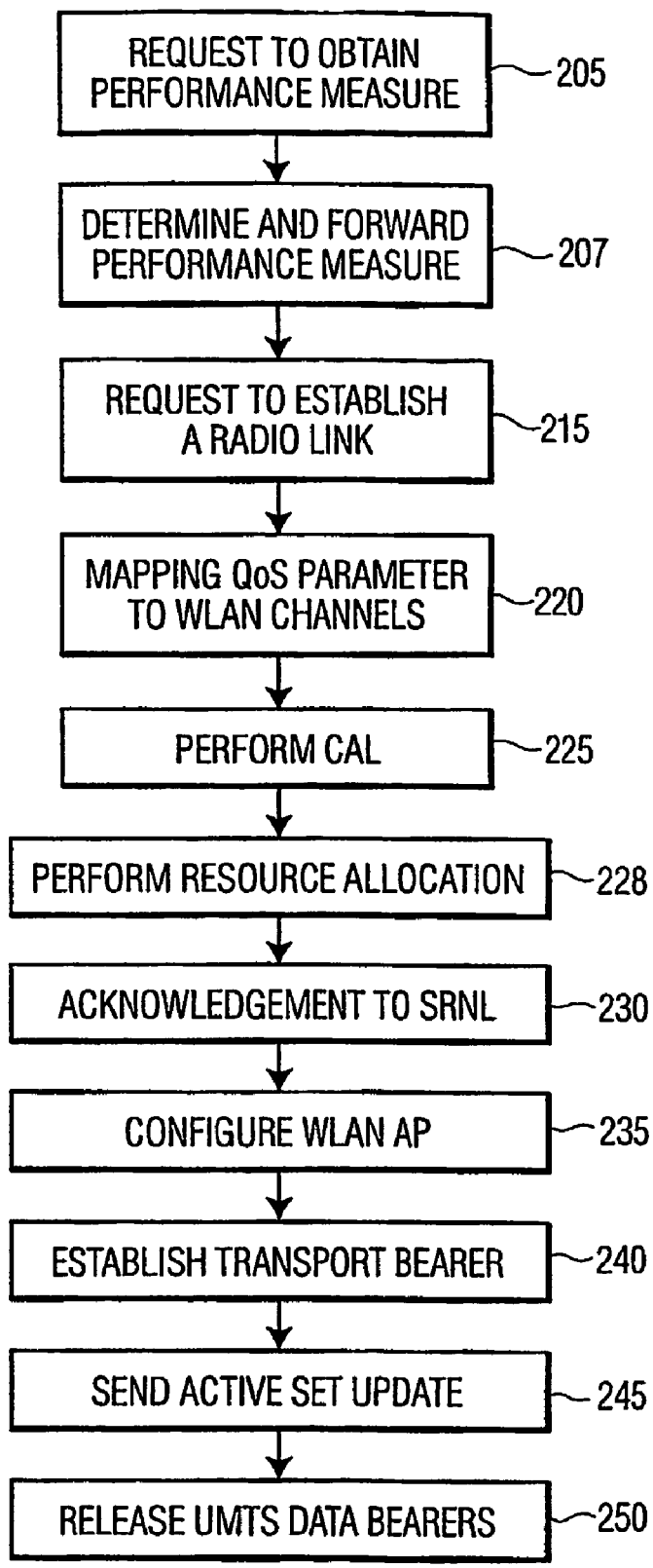
FIG. 2 is a diagram illustrating the steps involved in moving a User Equipment (UE) from a Universal Mobile Telecommunications System (UMTS) to a Wireless Local Area Network (WLAN) data plane, according to an illustrative embodiment of the present invention.

Inside the UTRAN 165, RNCs corresponding to radio network subsystems are connected together through an Iur interface 175. The Iu and Iur interfaces are logical interfaces. The Iur interface 175 can be conveyed over a direct physical connection between RNCs (105 & 130) or virtual networks using any suitable transport network. For each connection between User Equipment (UE) 120 and the UTRAN 165, one RNC is the Serving RNC (SRNC) responsible for the resources of its set of cells. When required, a Drift RNC (DRNC) supports the SRNC by providing radio resources as shown in FIG. 2 below. The role of an RNC (Serving or Drift) is on a per connection basis between a UE and the UTRAN 165.

A number of Access Points (APs) (e.g., WLAN AP 110) are tied back to the InterWorking Function (IWF) 105 that, in turn, is connected to the UMTS. The interworking function 105 may be embodied within a separate hardware coupled to the access points, or as a portion of the access point, and include various software modules and hardware necessary to implement the desired functions. As shown in FIG. 1, according to the present invention, the IWF 105 implements the Iur user plane interface between itself 105 and the RNC 130 and acts as a DRNC (drift RNC) for the UMTS network.

The coupling employed herein is referred to as "hybrid coupling", since the tight and loose coupling definitions of the European Telecommunications Standards Institute (ETSI) do not describe the coupling employed by the present invention where the signaling and user planes are split between the UMTS and the WLAN. The splitting of the signaling and user planes aids in keeping the WLAN gateway (i.e., the IWF) simple, as the WLAN gateway only needs to carry the user plane while the complex control plane reuses the UMTS. For Packet Switched (PS) services, the data plane takes the majority of radio resources. By diverting the data part to the WLAN in hotspots, considerable radio resources are conserved and can now be used for other users and other services, while the UE retains the connection with the CN 170.

FIG. 2 is a diagram illustrating the steps involved in moving a User Equipment (UE) from a Universal Mobile Telecommunications System (UMTS) to a Wireless Local Area Network (WLAN) data plane, according to an illustrative embodiment of the present invention. The steps depicted in FIG. 2 correspond to signaling between a UE, a UMTS Serving Radio Network Controller (SRNC), and a WLAN Inter-Working Function (IWF) employed as a Drift RNC (DRNC). In the example of FIG. 2 as well as the following examples, the UE, SRNC, and WLAN IWF shall hereinafter be respectively represented by UE 120, RNC 130, and IWF 105 shown in FIG. 1.

Upon identifying a UE 120 that is attached to a node B that, in turn, is close to a WLAN coverage area, the UTRAN 165 requests that the UE 120 obtain a performance measure (e.g., Bit Error Rate (BER)) on the WLAN and to forward a measurement report corresponding to the performance measure to the UTRAN 165 (step 205). Accordingly, the performance measure on the WLAN is obtained by the UE 120, and the measurement report is forwarded from the UE 120 to the UTRAN 165 (step 207). If the performance measure is greater than a pre-determined threshold, then the SRNC 130 can utilize the WLAN IWF 105 as a DRNC as illustrated in FIG. 1 and in steps 215 through 245 that follow. The UE 120 will process this new radio (WLAN) link but remain camped to the cell that belongs to the SRNC 130.

If a radio link is to be set up in a node-B (not shown) that is controlled by an RNC (not shown) other than the SRNC 130, then a request to establish the radio link is sent from the SRNC 130 to the DRNC (i.e., the IWF) 105 (step 215). That is, the SRNC 130 requests that the DRNC (IWF) 105 establish a Radio Link through a RADIO-LINK SETUP request. The request is made using an RNSAP message. The RNSAP message includes QoS parameters and the type of Dedicated/Common Transport Channel to be used.

According to the QoS parameters, the requested service may be assigned a type of service by the IWF 105 based on a mapping between UMTS QoS classes and WLAN QoS parameters (if the WLAN supports QoS), as well as a WLAN physical layer and Media Access Control (MAC) layer parameters (step 220).

Typically, Call Admission Control (CAC) is always performed in the SRNC 130. However, if an Iur (hereinafter Iur 175 depicted in FIG. 1) is to be used (as in this example), then CAC is performed within the DRNC, i.e., the IWF 105 (step 225), as well as resource allocation being performed within the DRNC, i.e., the IWF 105 (step 228). The CAC may be performed and resources allocated by the IWF 105 according to pre-established criteria (which may be static and/or dynamic). The criteria may include, but is not limited to, the following: type of service assigned by the IWF 105 and the type of Dedicated/Common Transport Channel requested by the SRNC 130; WLAN resources available in the AP 110 to which the UE 120 shall attach. Moreover, allocation and pre-emption of Radio Links in the IWF 105 when a RADIO LINK SETUP request comes from the SRNC can follow procedures that use an allocation/retention priority QoS attribute.

Acknowledgement is sent back to the SRNC 130 according to the result of the CAC (step 230). The acknowledgement is sent using an RNSAP message. Layer 1 (L1) and the MAC layer are configured accordingly in the WLAN AP 110 (step 235).

The SRNC 130 establishes the transport bearer over the Iur 175 (using, e.g., Access Link Control Application Protocol (ALCAP)) (step 240). The SRNC 130 then sends an ACTIVE SET UPDATE message to the UE 120 in order to signal a new active radio link having designated data and control paths (step 245). The data path is UE 120 <->IWF 105 <->RNC <->SGSN 135 <->GGSN 140 and the control path is UE 120 <->Node B 125 <->RNC 130 <->SGSN 135 <->GGSN 140 (as in UMTS) as illustrated in FIG. 1. The UMTS data bearers, if in existence, shall be released when no more data activity is seen on the UMTS data channels (step 250).

Figure 3:
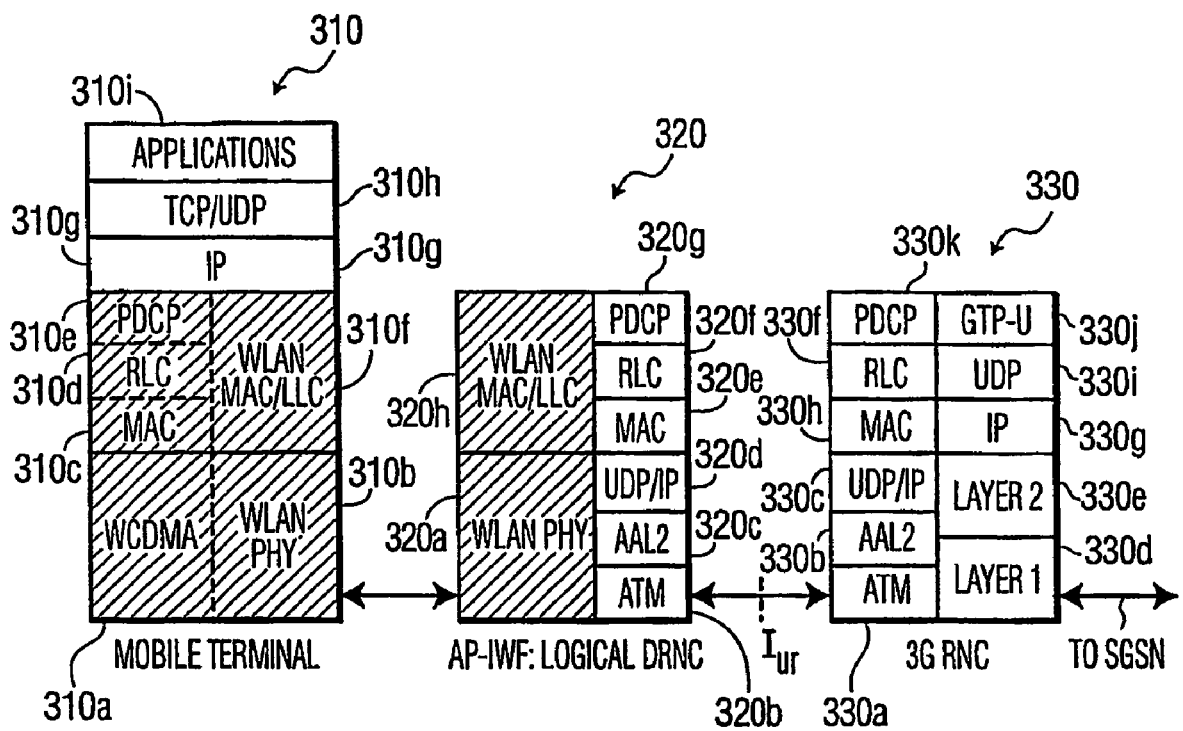
FIG. 3 is a diagram illustrating the protocol stack from User Equipment (UE) to a Universal Mobile Telecommunications System (UTMS) Radio Network Controller (RNC) for a user plane, according to an illustrative embodiment of the present invention.

FIG. 3 is a diagram illustrating the protocol stack from User Equipment (UE) to a Universal Mobile Telecommunications System (UTMS) Radio Network Controller (RNC) for a user plane, according to an illustrative embodiment of the present invention.

A UE protocol stack 31-0 includes a Wideband Code Division Multiple Access (WCDMA) layer portion 310a, a WLAN Physical (PHY) layer portion 310b, a MAC layer portion 310c, a Radio Link Control (RLC) layer portion 310d, a Packet Data Convergence Protocol (PDCP) layer portion 310e, a WLAN MAC/Logical Link Controller (LLC) layer portion 310f, an Internet Protocol (IP) layer 310g, a Transmission Control Protocol (TCP)/User Datagram Protocol (UDP) layer 310h, and an applications layer 310i.

An IWF (employed herein as a DRNC) protocol stack 320 includes a WLAN PHY layer portion 320a, an ATM layer portion 320b, an Asynchronous Transfer Mode Adaptation Layer 2 (AAL2) portion 320c, a UDP/IP layer portion 320d, a MAC layer portion 320e, an RLC layer portion 320f, a PDCP layer portion 320g, and a WLAN MAC/LLC layer portion 320h.

An RNC protocol stack 330 includes an ATM layer portion 330a, an AAL2 portion 330b, a UDP/IP layer portion 330c, a Layer 1 portion 330d, a Layer 2 portion 330e, a MAC layer portion 330f, an IP layer portion 330g, an RLC layer portion 330h, a UDP layer portion 330i, a General Packet Radio Service Tunneling Protocol User (GTP-U) portion 330j, and a PDCP portion 330k.

Figure 4:
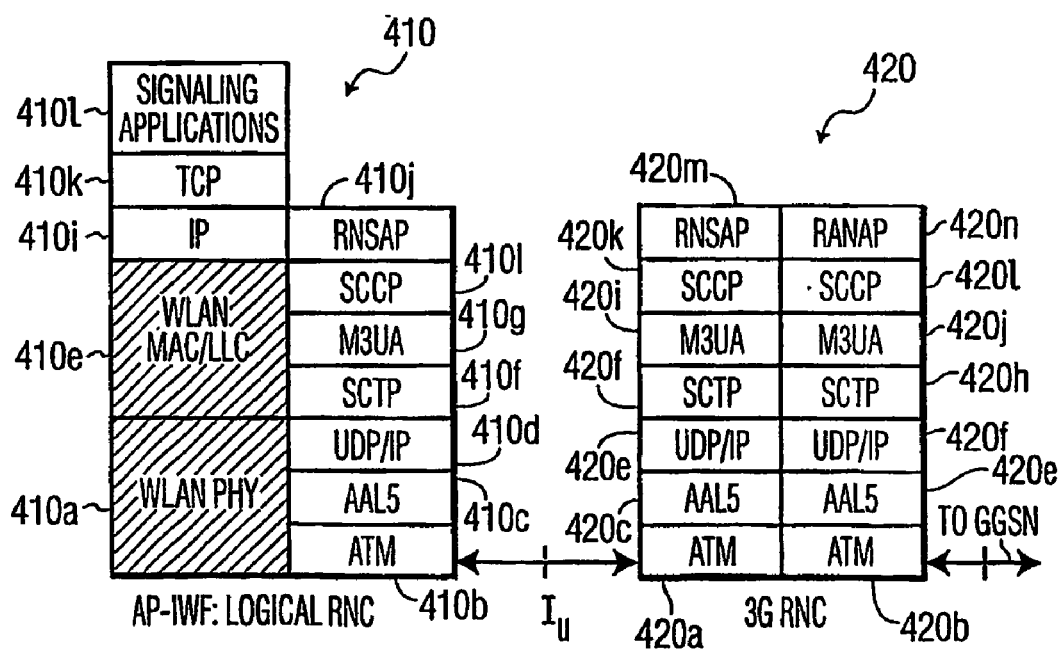
FIG. 4 is a diagram illustrating the protocol stack from a WLAN Access Point (AP)—InterWorking Function (IWF) side to a Universal Mobile Telecommunications System (UTMS) Radio Network Controller (RNC) for the control plane, according to an illustrative embodiment of the present invention.

FIG. 4 is a diagram illustrating the protocol stack from a WLAN Access Point (AP)—InterWorking Function (IWF) side to a Universal Mobile Telecommunications System (UTMS) Radio Network Controller (RNC) for the control plane, according to an illustrative embodiment of the present invention. In the illustrative embodiment of FIG. 4, the IWF communicates with the UMTS over a Iur interface as a logical Drift Radio Network Controller (DRNC).

An AP-IWF (logical RNC) protocol stack 410 includes a WLAN PHY layer portion 410a, an ATM layer portion 410b, an Asynchronous Transfer Mode Adaptation Layer 5 (AAL5) portion 410c, a UDP/IP layer portion 410d, a WLAN MAC/LLC layer portion 410e, a Simple Transmission Control Protocol (SCTP) layer portion 410f, an MTP3 User Adaptation Layer (M3UA) portion 4109, a Signaling Connection Control Part (SCCP) layer portion 410h, an IP layer portion 410i, a Radio Network Subsystem Application Part (RNSAP) layer portion 410j, a Transmission Control Protocol layer 410k, and a signaling applications layer 410l.

An RNC protocol stack 420 includes a first ATM layer portion 420a, a second ATM layer portion 420b, a first AAL5 portion 420c, a second AAL5 portion 420d, a first UDP/IP layer portion 420e, a second UDP/IP layer portion 420f, a first SCTP layer portion 420g, a second SCTP layer portion 420h, a first M3UA layer portion 420i, a second M3UA layer portion 420j, a first SCCP layer portion 420k, a second SCCP layer portion 420l, a first RNSAP layer portion 420m, and a second RNSAP layer portion 420n.

A description will now be given of some of the many advantages of the present invention. One such advantage is that the QOS negotiations, mobility, addressing and AAA procedures of the UMTS are re-used; this helps keep the WLAN gateway (IWF) simple, as the IWF only carries the user plane while the complex control plane reuses the UMTS system. For PS services, the data plane consumes the majority of radio resources. Thus, by diverting the data part to the WLAN in hotspots, considerable expensive UMTS radio resources can be saved and/or used for other users and/or other services while the UE retains the connection with the CN. Another advantage is that the present invention allows all the cellular operators to share the WLAN in hot spots as long as the Iur interface is available with each operator. Yet another advantage is that the UMTS operator can use existing WLAN deployment instead of deploying his own WLANs in hotspots. Still another advantage is that the UMTS operator provides one point of attachment (GGSN) to give access to both the UMTS and the WLAN networks. A further advantage of the present invention is scalability, as an RNC can be attached to up to seven DRNCs. Moreover, another advantage of the present invention is that no modifications to the existing UMTS network nodes are required for interworking.

Although the illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for supporting an interworking between a wireless local area network and a mobile communications network, the mobile communications network including a serving radio network controller, a universal mobile telecommunications system, and a radio access network comprising a transceiver coupled to a radio network controller, the radio network controller being coupled to a core network, the method comprising the steps of:
   providing an interworking function disposed on the wireless local area network side of the mobile communications network;
   connecting the wireless local area network to the mobile communications network by employing the interworking function as a drift radio network controller associated with the mobile communications network, wherein the connecting step connects the wireless local area network to the mobile communications network through a user plane interface disposed between the interworking function and the serving radio network controller, and wherein the mobile communications network further including a serving general packet radio service support node, a gateway general packet radio service support node, and a node B;
   forming a data path from a user equipment to the interworking function to the serving radio network controller to the serving general packet radio service support node to the gateway general packet radio service support node;
   forming a control path from the user equipment to the node B to the serving radio network controller to the serving general packet radio service support node to the gateway general packet radio service support node; and
   performing call admission control by the interworking function, wherein said performing step is implemented based upon at least one of a type of service assigned by the interworking function, a type of dedicated/common transport channel requested by the serving radio network controller, and wireless local area network resources available in an access point to which a user equipment will attach.

2. The method of claim 1, wherein said connecting step comprises the step of establishing an Iur interface between the interworking function and the serving radio network controller.

3. The method of claim 2, further comprising the step of diverting data from the serving radio network controller to the wireless local area network through the Iur interface.

4. The method of claim 1, wherein said connecting step splits a control plane between the mobile communications network and the wireless local area network and also splits a user plane between the mobile communications network and the wireless local area network.

5. The method of claim 4, wherein said connecting step comprises the step of transmitting a radio link setup request from the serving radio network controller to the interworking function.

6. The method of claim 5, wherein said transmitting step is performed using a radio network subsystem application part message that includes at least one of quality of service parameters and a type of dedicated/common transport channel.

7. The method of claim 1, further comprising the step of releasing data bearers of the mobile communications network when activity has ceased on data channels of the mobile communications network.

8. An apparatus for supporting an interworking between a wireless local area network and a mobile communications network, the apparatus comprising;
   an interworking function disposed on a wireless local area network side of the mobile communications network;
   means for connecting the wireless local area network to the mobile communications network through a user plane interface, and wherein the interworking function is used as a drift radio network controller for the mobile communications network;
   wherein the mobile communications network has a serving radio network controller, and a user plane interface is disposed between the interworking function and the serving radio network controller, wherein the mobile communications network further includes a serving general packet radio service support node, a gateway general packet radio service support node, and a node B;
   means for forming a data path from a user equipment to the interworking function to the serving radio network controller to the serving general packet radio service support node to the gateway general packet radio service support node; and
   means for forming a control path from the user equipment to the node B to the serving radio network controller to the serving general packet radio service support node to the gateway general packet radio service support node; and
   means for performing call admission control by the interworking function, wherein the means for performing call admission control employs at least one of a type of service assigned by the interworking function, a type of dedicated/common transport channel requested by the serving radio network controller, and wireless local area network resources available in an access point to which a user equipment will attach.

9. The apparatus of claim 8, wherein said means for connecting comprises means for establishing an Iur interface between the interworking function and the serving radio network controller.

10. The apparatus of claim 9, further comprising means for diverting data from the serving radio network controller to the wireless local area network through the Iur interface.

11. The apparatus of claim 8, wherein said means for connecting splits a control plane between the mobile communications network and the wireless local area network and also splits a user plane between the mobile communications network and the wireless local area network.

12. The apparatus of claim 11, wherein said means for connecting comprises means for transmitting a radio link setup request from the serving radio network controller to the interworking function.

13. The apparatus of claim 12, wherein said means for transmitting uses a radio network subsystem application part message that includes at least one of quality of service parameters and a type of dedicated/common transport channel.

14. The apparatus of claim 8, further comprising means for releasing data bearers of the mobile communications network when activity has ceased on data channels of the mobile communications network.

* * * * *